(12) United States Patent
Wakayama et al.

(10) Patent No.: US 11,860,514 B2
(45) Date of Patent: Jan. 2, 2024

(54) CAMERA

(71) Applicants: NIDEC COPAL CORPORATION, Tokyo (JP); FUJIFILM CORPORATION, Tokyo (JP)

(72) Inventors: Tomihiro Wakayama, Tokyo (JP); Yuichi Ozawa, Tokyo (JP); Yoshiki Murayama, Tokyo (JP); Takehisa Kirihara, Tokyo (JP); Hisashi Tasaka, Tokyo (JP)

(73) Assignees: NIDEC COPAL CORPORATION, Tokyo (JP); FUJIFILM CORPORATION, Tokyo (JP)

( * ) Notice: Subject to any disclaimer, the term of this patent is extended or adjusted under 35 U.S.C. 154(b) by 11 days.

(21) Appl. No.: 17/786,535

(22) PCT Filed: Dec. 9, 2020

(86) PCT No.: PCT/JP2020/045801
§ 371 (c)(1),
(2) Date: Jun. 17, 2022

(87) PCT Pub. No.: WO2021/125003
PCT Pub. Date: Jun. 24, 2021

(65) Prior Publication Data
US 2023/0037456 A1    Feb. 9, 2023

(30) Foreign Application Priority Data

Dec. 19, 2019   (JP) ................. 2019-228954

(51) Int. Cl.
*G03B 17/04*   (2021.01)
*G03B 5/00*    (2021.01)
*G03B 17/12*   (2021.01)

(52) U.S. Cl.
CPC ............. *G03B 17/045* (2013.01); *G03B 5/00* (2013.01); *G03B 17/12* (2013.01)

(58) Field of Classification Search
CPC .................................................. G03B 17/045
See application file for complete search history.

(56) References Cited

U.S. PATENT DOCUMENTS

| 1,576,340 | A | * | 3/1926 | Le Provost | G03B 17/04 |
| | | | | | 396/22 |
| 5,649,251 | A | * | 7/1997 | Suzuki | G03B 17/045 |
| | | | | | 396/344 |
| 2004/0150891 | A1 | * | 8/2004 | Ichino | G02B 7/021 |
| | | | | | 359/704 |

FOREIGN PATENT DOCUMENTS

| JP | 2004233381 A | 8/2004 |
| KR | 1020170140712 A | 12/2017 |

OTHER PUBLICATIONS

International Search Report in PCT/JP2020/045801, dated Feb. 22, 2021. 4pp.

* cited by examiner

*Primary Examiner* — Noam Reisner
(74) *Attorney, Agent, or Firm* — HAUPTMAN HAM, LLP

(57) ABSTRACT

A camera can perform two different photographing operations with a lens at different positions without vignetting while preventing entry of light and dust. A camera includes a frame including a film compartment to contain a photographic film and a barrel extending from the film compartment in an optical axis direction, and a lens barrel movable in the barrel in X-direction. The lens barrel includes cylinders movable frontward relative to the barrel, and a cylinder movable frontward relative to the cylinder. The camera includes a rear bellows connecting the frame and the cylin- (Continued)

der, and a front bellows connecting the cylinder and the cylinder. In a first photographing state in which the cylinders extend frontward relative to the barrel and the cylinder is accommodated inside the cylinder, the rear bellows is expanded and the front bellows is partially contracted. In a second photographing state, the cylinder extends frontward relative to the cylinder.

6 Claims, 10 Drawing Sheets

CAMERA

RELATED APPLICATIONS

The present application is National stage of application No. PCT/JP2020/045801, filed on Dec. 9, 2020, and claims priority based on Japanese Patent Application No. 2019-228954, filed Dec. 19, 2019.

FIELD

The present invention relates to a camera, and particularly, to a camera that allows a lens barrel to extend with a flexible bellows.

BACKGROUND

A known camera includes a lens barrel extension assembly for allowing a lens barrel to extend frontward in an optical axis direction. In such a camera, the lens barrel is typically connected to the camera body with a flexible bellows for preventing entry of light and dust (refer to, for example, Patent Literature 1). To perform a short-distance photographing (macro photographing) operation in addition to a normal photographing operation, the lens barrel is to be extended further than for the normal photographing operation. The bellows described above expands and contracts to a greater extent for the lens barrel extendable by a greater distance. The bellows can thus be captured in an image projected onto a photographic film when contracted, thus causing vignetting.

CITATION LIST

Patent Literature

Patent Literature 1: Japanese Unexamined Patent Application Publication No. 2004-233381

BRIEF SUMMARY

Technical Problem

In response to the above issue, one or more aspects of the present invention are directed to a camera that can perform two different photographing operations with a lens at different positions without vignetting while preventing entry of light and dust.

Solution to Problem

A camera according to one aspect of the present invention can perform two different photographing operations with a lens at different positions without vignetting while preventing entry of light and dust. The camera includes a frame including a film compartment to contain a photographic film and a barrel extending from the film compartment in an optical axis direction, and a lens barrel movable in the barrel in the optical axis direction. The lens barrel includes a rear lens barrel unit accommodated radially inside the barrel and movable frontward relative to the barrel, and a front lens barrel unit accommodated radially inside the rear lens barrel unit and movable frontward relative to the rear lens barrel unit. The front lens barrel unit accommodates at least one lens. The camera further includes a rear bellows connecting the frame and the rear lens barrel unit, and a front bellows connecting the rear lens barrel unit and the front lens barrel unit. The lens barrel has a retracted state in which the rear lens barrel unit is accommodated radially inside the barrel, and the front lens barrel unit is accommodated radially inside the rear lens barrel unit, a first photographing state in which the rear lens barrel unit extends frontward relative to the barrel, and the front lens barrel unit is accommodated radially inside the rear lens barrel unit, and a second photographing state in which the rear lens barrel unit extends frontward relative to the barrel, and the front lens barrel unit extends frontward relative to the rear lens barrel unit. In the first photographing state, the rear bellows is expanded and is outside a light beam projected from the at least one lens onto the photographic film, and the front bellows is at least partially contracted and is outside the light beam projected from the at least one lens onto the photographic film.

DETAILED DESCRIPTION

Figure 1:
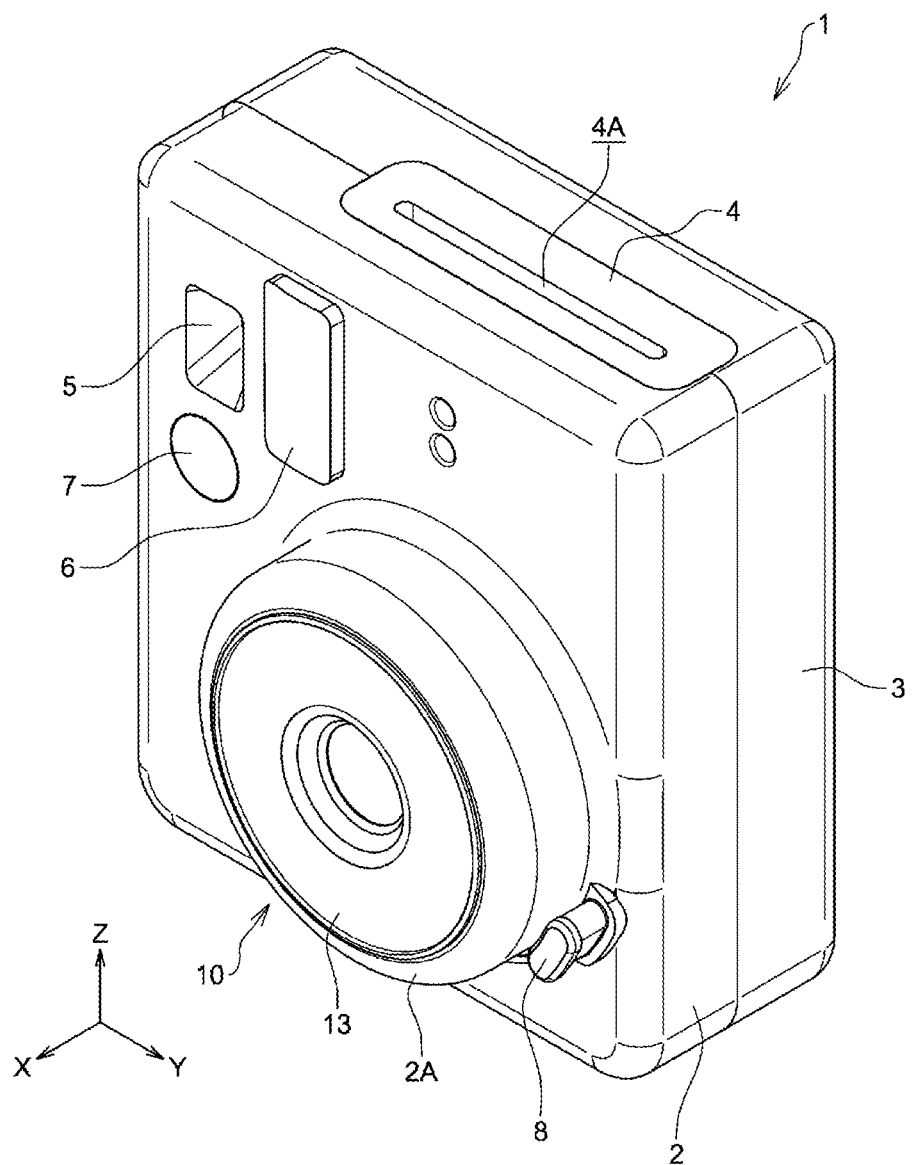
FIG. 1 is a perspective view of a camera according to one embodiment of the present invention.

A camera according to one or more embodiments of the present invention will now be described in detail with reference to FIGS. 1 to 10. In FIGS. 1 to 10, like reference numerals denote like or corresponding components. Such components will not be described repeatedly. In FIGS. 1 to 10, the scale and dimensions of each component may be exaggerated, or one or more components may not be shown.

FIG. 1 is a perspective view of a camera 1 according to one embodiment of the present invention. Although the camera 1 according to the present embodiment is a camera (instant camera) that uses a photographic film to be automatically developed after shooting, the present invention is also applicable to a camera other than such an instant camera. For ease of explanation in the present embodiment, the term front or frontward refers to the positive X-direction in FIG. 1, and the term rear or rearward refers to the negative X-direction in FIG. 1.

As shown in FIG. 1, the camera 1 includes a front cover 2, a rear cover 3 attached to the rear of the front cover 2, a top cover 4 sandwiched between the front cover 2 and the rear cover 3, and a lens barrel 10 accommodated in a cylindrical portion 2A of the front cover 2. The front cover 2 has a viewfinder 5. A flash window 6 is located adjacent to the viewfinder 5. A release button 7 is located in the negative Z-direction from the viewfinder 5. The top cover 4 has an ejection slit 4A extending in Y-direction, from which a photographic film developed after shooting is ejected.

Figure 2:
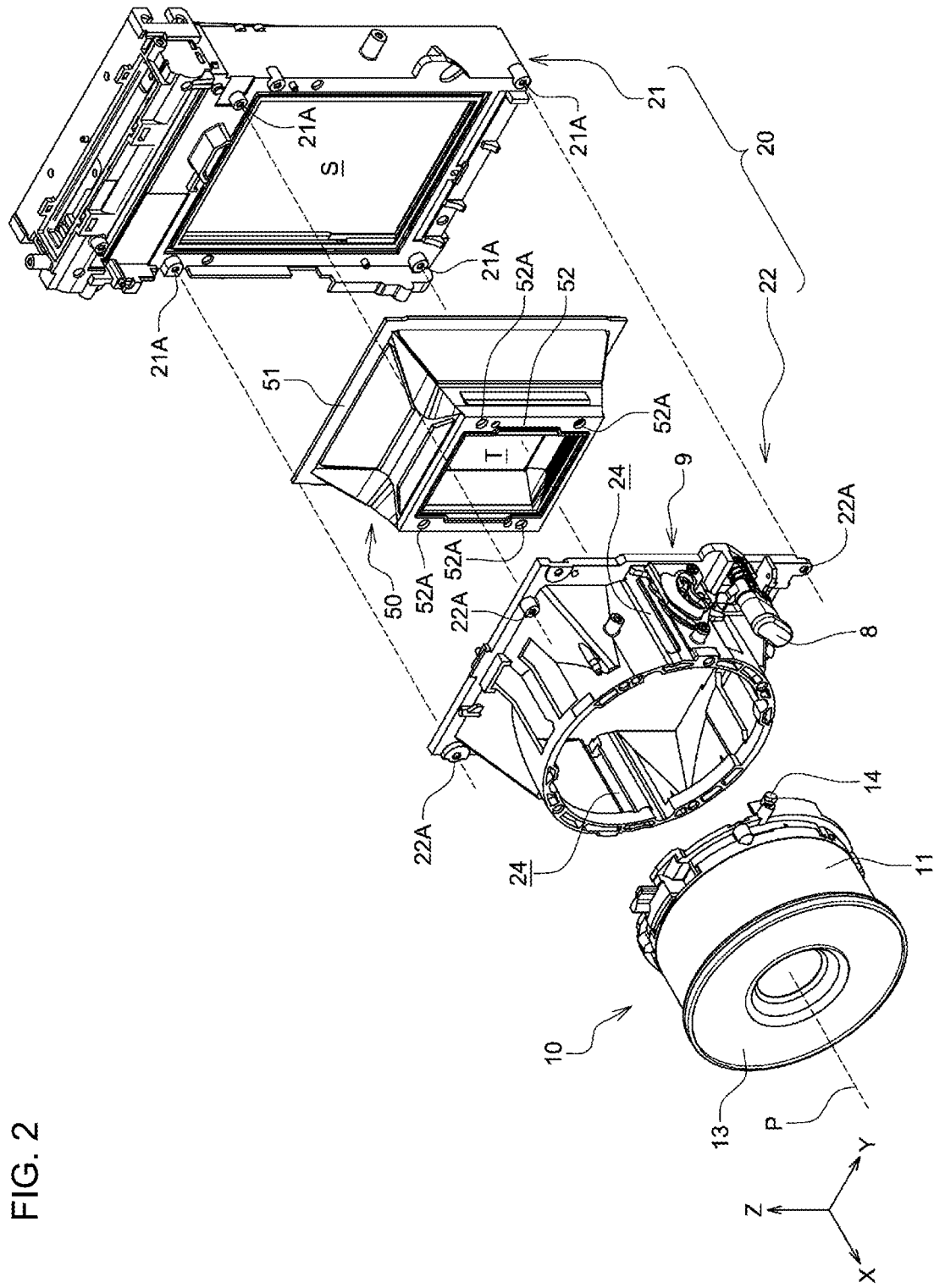
FIG. 2 is an exploded perspective view of some of the components of the camera shown in FIG. 1 accommodated in an internal space defined by a front cover, a rear cover, and a top cover.

FIG. 2 is an exploded perspective view of some of the components accommodated in an internal space defined by the front cover 2, the rear cover 3, and the top cover 4. As shown in FIG. 2, the camera 1 includes a frame 20 including a film compartment 21 and a cylindrical barrel 22. The film compartment 21 has an accommodating space S in which a photographic film is placed. The barrel 22 is attached to the front (positive X-direction) of the film compartment 21. The barrel 22 has threaded holes 22A. The film compartment 21 also has threaded holes 21A. The barrel 22 is attached to the film compartment 21 with screws (not shown) screwed into the threaded holes 22A and 21A to form the frame 20. The barrel 22 attached to the film compartment 21 extends frontward (positive X-direction) from the film compartment 21 and holds the lens barrel 10 inside.

Figure 3:
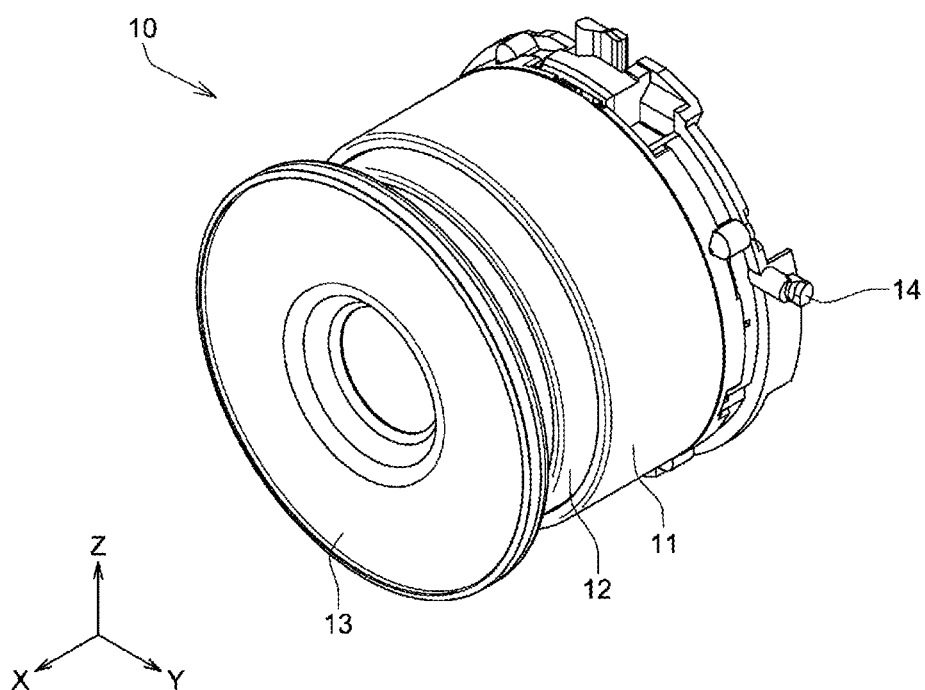
FIG. 3 is a perspective view of a lens barrel shown in FIG. 2 extending to its maximum length in the positive X-direction.

The lens barrel 10 in the present embodiment is extendable in the positive X-direction. FIG. 3 is a perspective view of the lens barrel 10 extending to its maximum length in the positive X-direction. As shown in FIG. 3, the lens barrel 10 includes a first cylinder 11, a second cylinder 12, and a third cylinder 13. The first cylinder 11 is movable in X-direction relative to the barrel 22 in the frame 20. The second cylinder 12 is movable in X-direction relative to the first cylinder 11. The third cylinder 13 is movable in X-direction relative to the second cylinder 12. In the present embodiment, the first cylinder 11 and the second cylinder 12 are included in one lens barrel unit (rear lens barrel unit), and the third cylinder 13 is included in another lens barrel unit (front lens barrel unit).

As shown in FIG. 3, the lens barrel 10 includes, on the rear edge of the first cylinder 11, two engagement protrusions 14 protruding radially outward. As shown in FIG. 2, the barrel 22 in the frame 20 has two guide grooves 24 corresponding to the engagement protrusions 14 and extending in the direction of an optical axis P (X-direction). Each engagement protrusion 14 on the lens barrel 10 is received in and engaged with the guide groove 24 on the barrel 22. The guide grooves 24 each have a width in Z-direction slightly larger than the width of the engagement protrusion 14 in Z-direction. The engagement protrusions 14 are thus movable in the direction of the optical axis P (X-direction) in the guide grooves 24 while being guided by the guide grooves 24.

Figure 4:
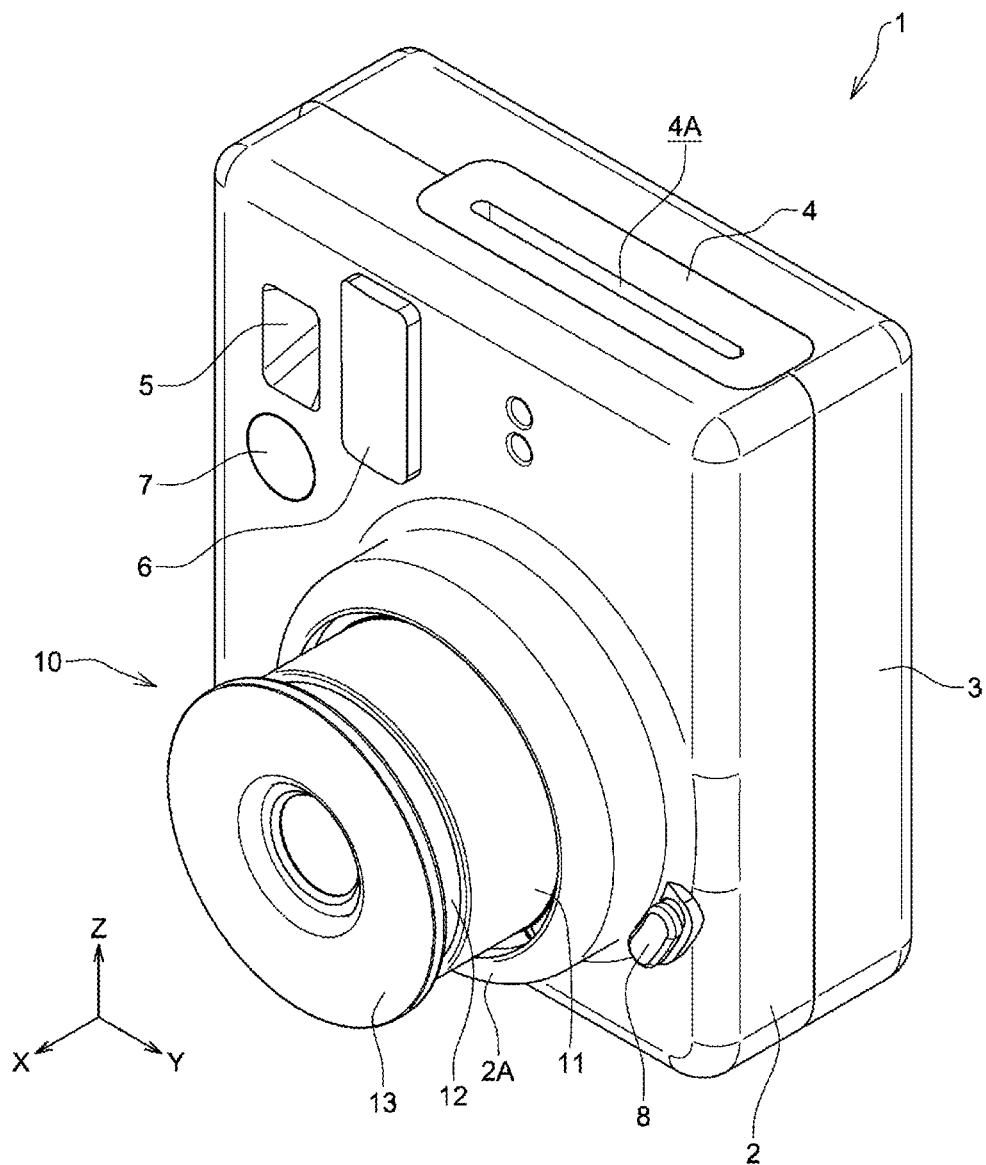
FIG. 4 is a perspective view of the camera shown in FIG. 1 in a first photographing state.

As shown in FIG. 2, the barrel 22 in the frame 20 includes an operation button 8 urged in the positive X-direction. As shown in FIG. 1, the operation button 8 protrudes from the front cover 2 in the positive X-direction near the cylindrical portion 2A of the front cover 2. A user can depress the operation button 8 in the negative X-direction. When the user depresses the operation button 8 in the negative X-direction, the engagement protrusion 14 on the lens barrel 10 is pushed by a lens barrel extension assembly 9 attached to the barrel 22 in the positive X-direction, causing the lens barrel 10 to extend in the positive X-direction as shown in FIG. 4. In response to the lens barrel 10 protruding from the barrel 22 in the positive X-direction, a switch assembly (not shown) turns on the camera 1. The structure of the lens barrel extension assembly 9 is not limited to a specific structure. The lens barrel extension assembly 9 may have any structure that can extend the lens barrel 10 in the positive X-direction.

In the present embodiment, the second cylinder 12 is moved by a moving assembly (not shown) in the positive X-direction relative to the first cylinder 11 as the first cylinder 11 moves in the positive X-direction relative to the barrel 22. Thus, as shown in FIG. 4, the second cylinder 12 extends from the first cylinder 11 in the positive X-direction. In this state, the user can perform a normal photographing operation. This state is hereafter referred to as a first photographing state.

Figure 5:
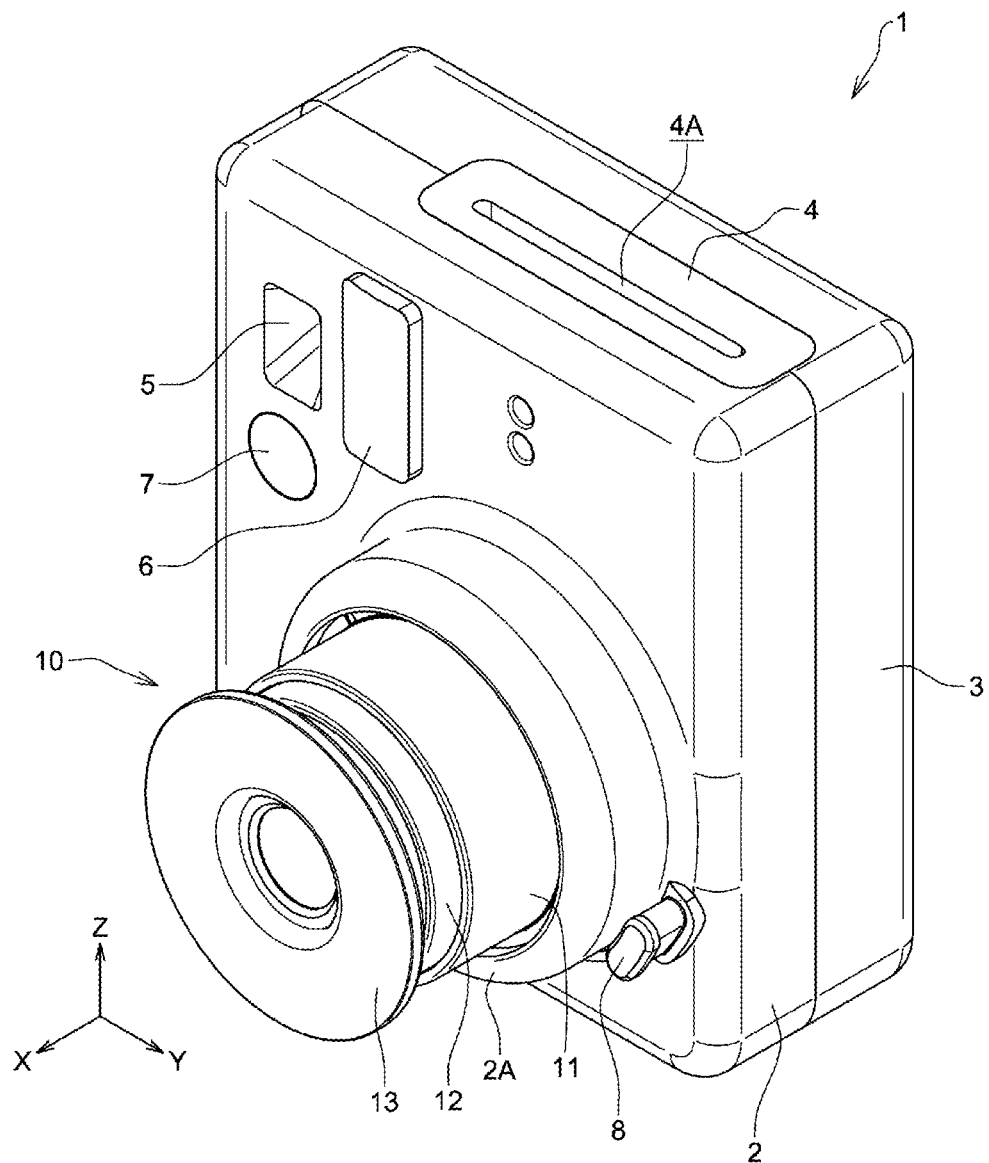
FIG. 5 is a perspective view of the camera shown in FIG. 1 in a second photographing state.

In the present embodiment, the user can manually pull the third cylinder 13 from the second cylinder 12 further in the positive X-direction in the state shown in FIG. 4. The third cylinder 13, which is pulled from the second cylinder 12 further in the positive X-direction, extends from the second cylinder 12 in the positive X-direction as shown in FIG. 5. In this state, the user can perform, for example, a short-distance macro photographing operation. This state is hereafter referred to as a second photographing state.

Figure 6:
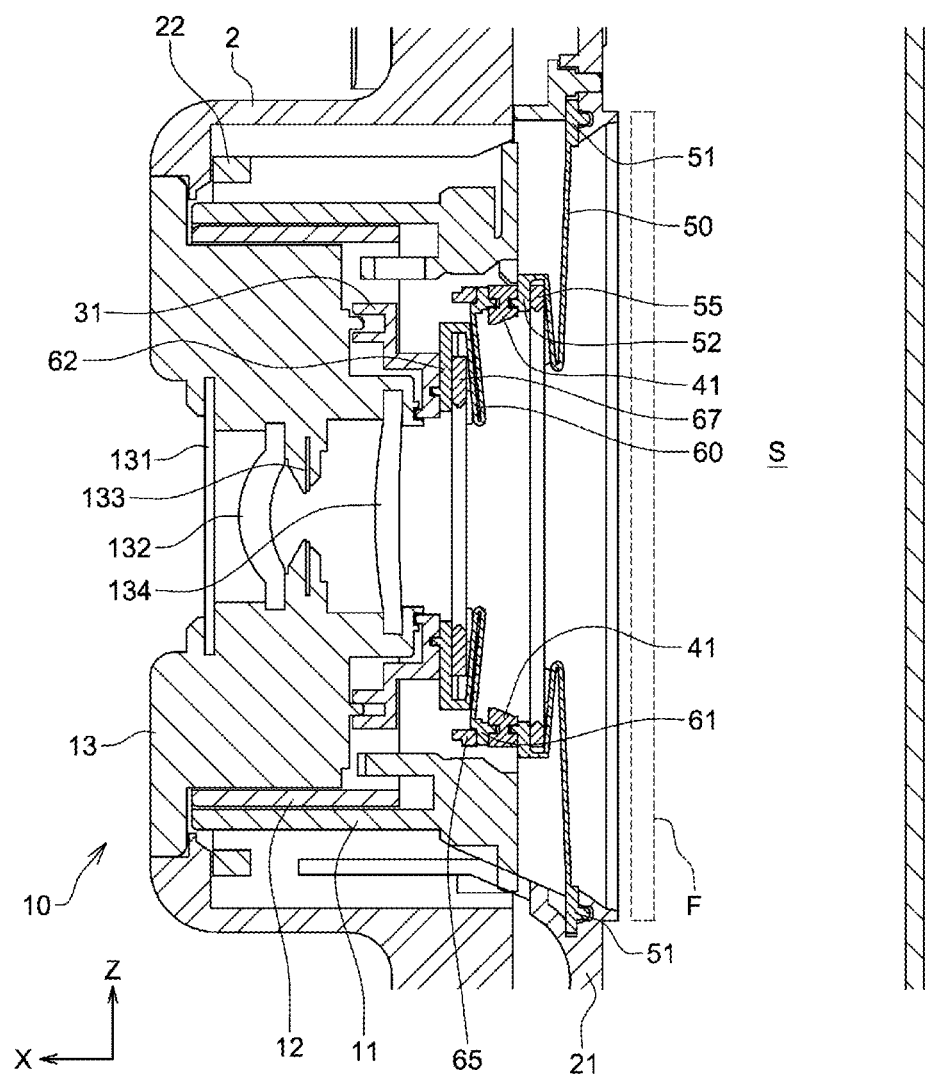
FIG. 6 is a partial longitudinal cross-sectional view of the camera shown in FIG. 1 in a retracted state.

FIG. 1 shows the lens barrel 10 accommodated in the barrel 22 in the frame 20. The lens barrel 10 has a minimum length in X-direction in this state. This state is hereafter referred to as a retracted state. FIG. 6 is a partial longitudinal cross-sectional view of the camera 1 in the retracted state. As shown in FIG. 6, the third cylinder 13 accommodates a barrier 131, a first lens 132, an aperture 133, and a second lens 134 in this order from a subject (in the positive X-direction). A photographic film F is placed at a predetermined position in the accommodating space S in the film compartment 21.

As shown in FIG. 6, a rear bellows 50 is located between the first cylinder 11 in the lens barrel 10 and the film compartment 21 in the frame 20. The rear bellows 50 is formed from a flexible material such as rubber and expands and contracts as the first cylinder 11 moves relative to the barrel 22. As shown in FIG. 2, the rear bellows 50 has a rectangular opening T inside. The opening T gradually enlarges from the first cylinder 11 toward the frame 20. The rear bellows 50 includes, on its rear end, a rectangular rear connector 51 flaring outward. The rear connector 51 is held between the film compartment 21 and the barrel 22 as shown in FIG. 6.

Figure 7:
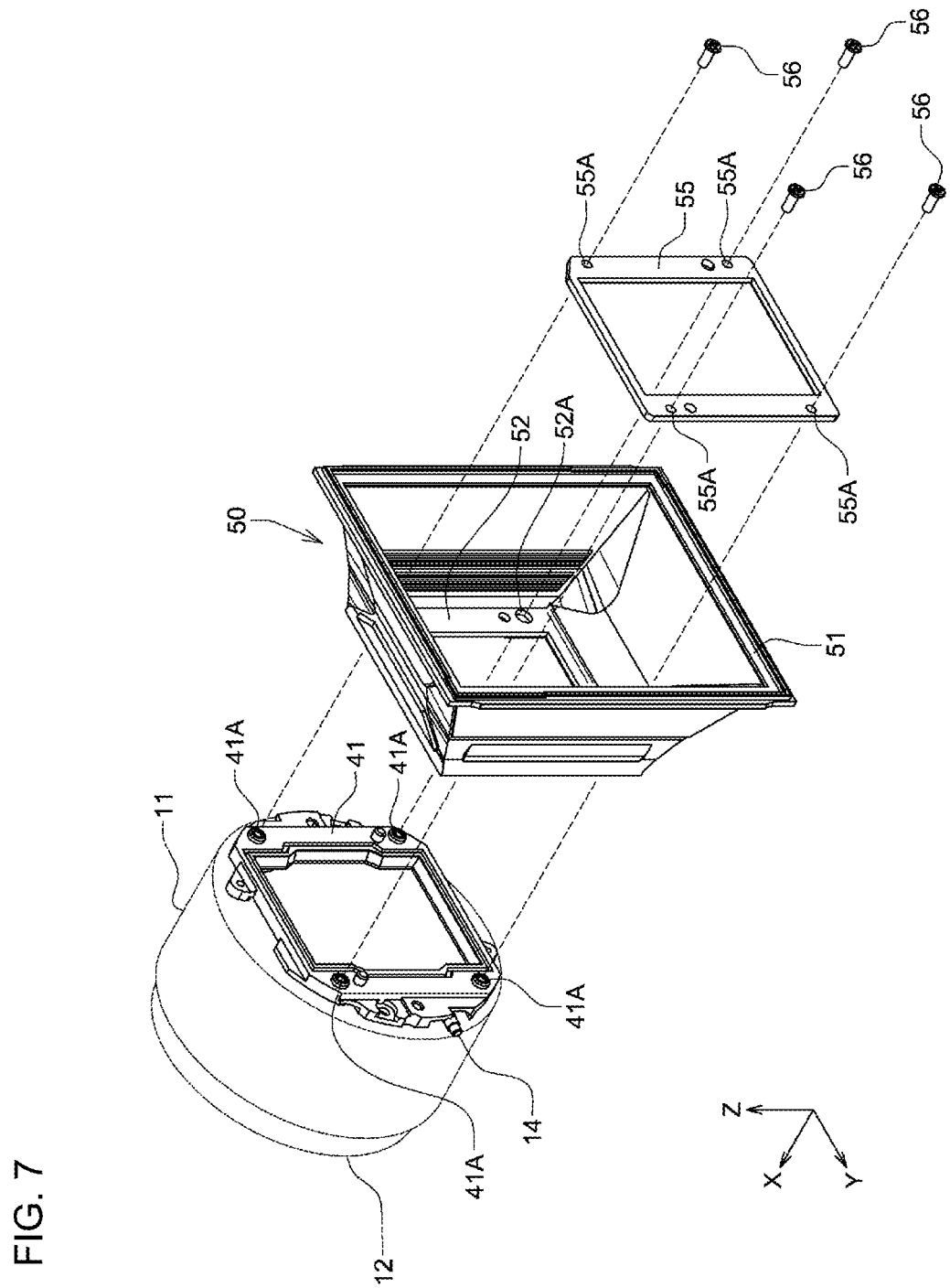
FIG. 7 is an exploded perspective view describing attachment of a rear bellows shown in FIG. 2.

FIG. 7 is an exploded perspective view describing attachment of the rear bellows 50. As shown in FIGS. 2 and 7, the rear bellows 50 includes, on its front end, a rectangular front connector 52 extending inward. The front connector 52 has multiple threaded holes 52A. As shown in FIG. 7, the first cylinder 11 in the lens barrel 10 includes a rectangular frame-shaped connecting flange 41 (first connecting flange) in its rear end. The connecting flange 41 has threaded holes 41A corresponding to the threaded holes 52A in the front connector 52 in the rear bellows 50. A rectangular frame-shaped attachment plate 55 is located behind the front connector 52 in the rear bellows 50 (in the negative X-direction). The attachment plate 55 also has threaded holes 55A corresponding to the threaded holes 52A in the front connector 52 in the rear bellows 50. Screws 56 are screwed into the threaded holes 55A in the attachment plate 55, the threaded holes 52A in the front connector 52 in the rear bellows 50, and the threaded holes 41A in the connecting flange 41 in the first cylinder 11 to hold the front connector 52 in the rear bellows 50 between the attachment plate 55 and the connecting flange 41 in the first cylinder 11.

As shown in FIG. 6, a front bellows 60 is located between the first cylinder 11 and the third cylinder 13 in the lens barrel 10. The front bellows 60 is formed from a flexible material such as rubber and expands and contracts as the third cylinder 13 moves relative to the first cylinder 11.

Figure 8:
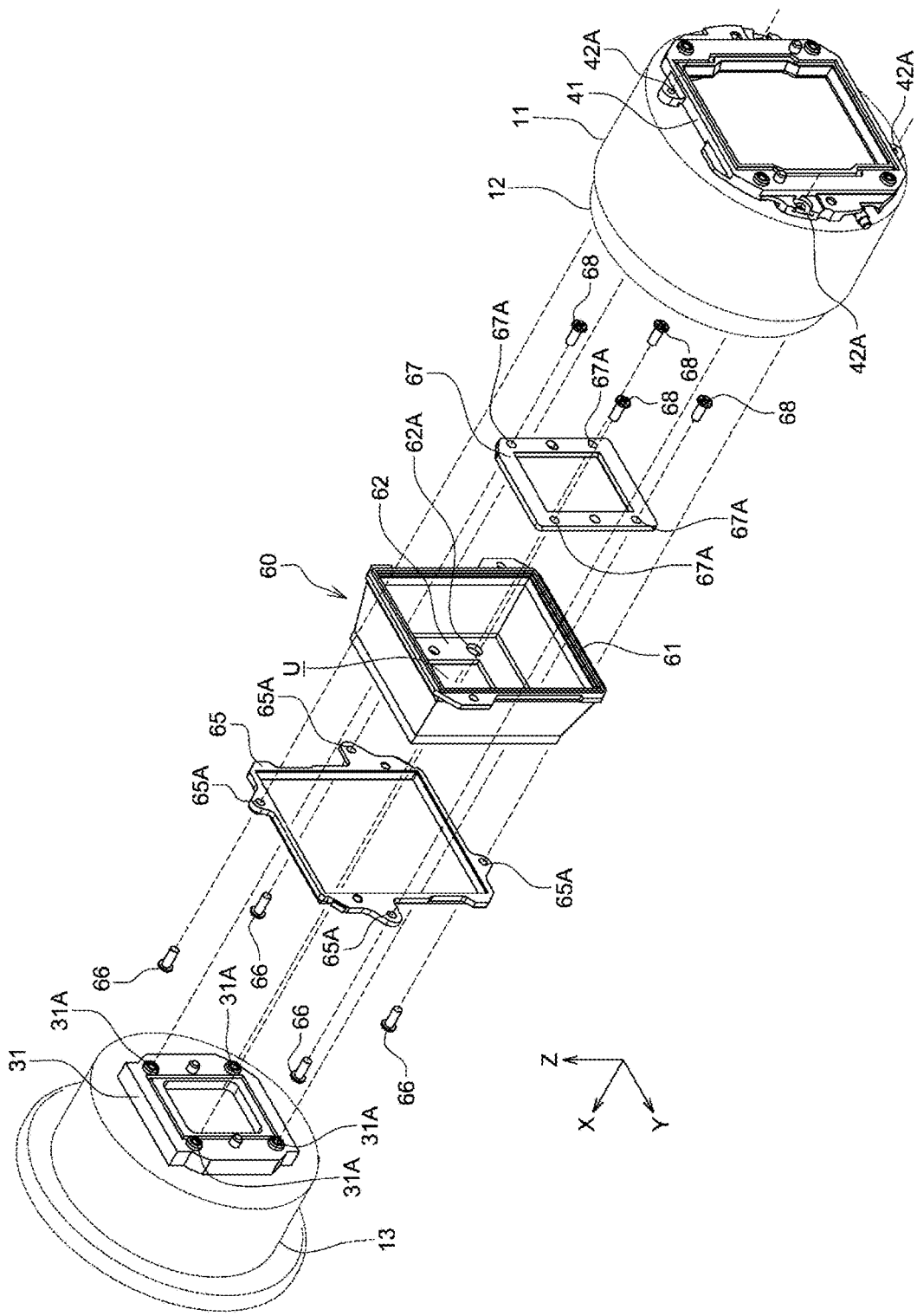
FIG. 8 is an exploded perspective view describing attachment of a front bellows shown in FIG. 6.

FIG. 8 is an exploded perspective view describing attachment of the front bellows 60. As shown in FIG. 8, the front bellows 60 has a rectangular opening U inside. The opening U gradually enlarges from the third cylinder 13 toward the first cylinder 11. As shown in FIG. 8, the front bellows 60 includes, on its rear end, a rectangular rear connector 61 flaring outward. A rectangular frame-shaped attachment plate 65 is located in front of the rear connector 61 in the front bellows 60 (in the positive X-direction). The attachment plate 65 has multiple threaded holes 65A. The connecting flange 41 in the first cylinder 11 described above has threaded holes 42A corresponding to the threaded holes 65A in the attachment plate 65. Screws 66 are screwed into the threaded holes 65A in the attachment plate 65 and the threaded holes 42A in the connecting flange 41 in the first cylinder 11 from one end of the connecting flange 41 facing the third cylinder 13 to hold the rear connector 61 in the front bellows 60 between the attachment plate 65 and the connecting flange 41 in the first cylinder 11.

As shown in FIG. 8, the front bellows 60 includes, on its front end, a rectangular front connector 62 extending inward. The front connector 62 has multiple threaded holes 62A. The third cylinder 13 in the lens barrel 10 includes a rectangular frame-shaped connecting flange 31 (second connecting flange) on its rear end. The connecting flange 31 has threaded holes 31A corresponding to the threaded holes 62A in the front connector 62 in the front bellows 60. The connecting flange 31 may be integral with the third cylinder 13 or may be a separate component from the third cylinder 13.

A rectangular frame-shaped attachment plate 67 is located behind the front connector 62 in the front bellows 60 (in the negative X-direction). The attachment plate 67 also has threaded holes 67A corresponding to the threaded holes 62A in the front connector 62 in the front bellows 60. Screws 68 are screwed into the threaded holes 67A in the attachment plate 67, the threaded holes 62A in the front connector 62 in the front bellows 60, and the threaded holes 31A in the connecting flange 31 on the third cylinder 13 to hold the front connector 62 in the front bellows 60 between the attachment plate 67 and the connecting flange 31 on the third cylinder 13.

In the retracted state shown in FIG. 6, the first cylinder 11 and the second cylinder 12 in the lens barrel 10 are accommodated radially inside the barrel 22, and the third cylinder 13 is accommodated radially inside the second cylinder 12. The first cylinder 11 is at its farthest extent in the negative X-direction. The rear bellows 50 is contracted in X-direction. The third cylinder 13 is nearest the first cylinder 11 in X-direction. The front bellows 60 is contracted in X-direction. In this state, the camera 1 is not turned on, and photographing with the camera 1 is not performed.

Figure 9:
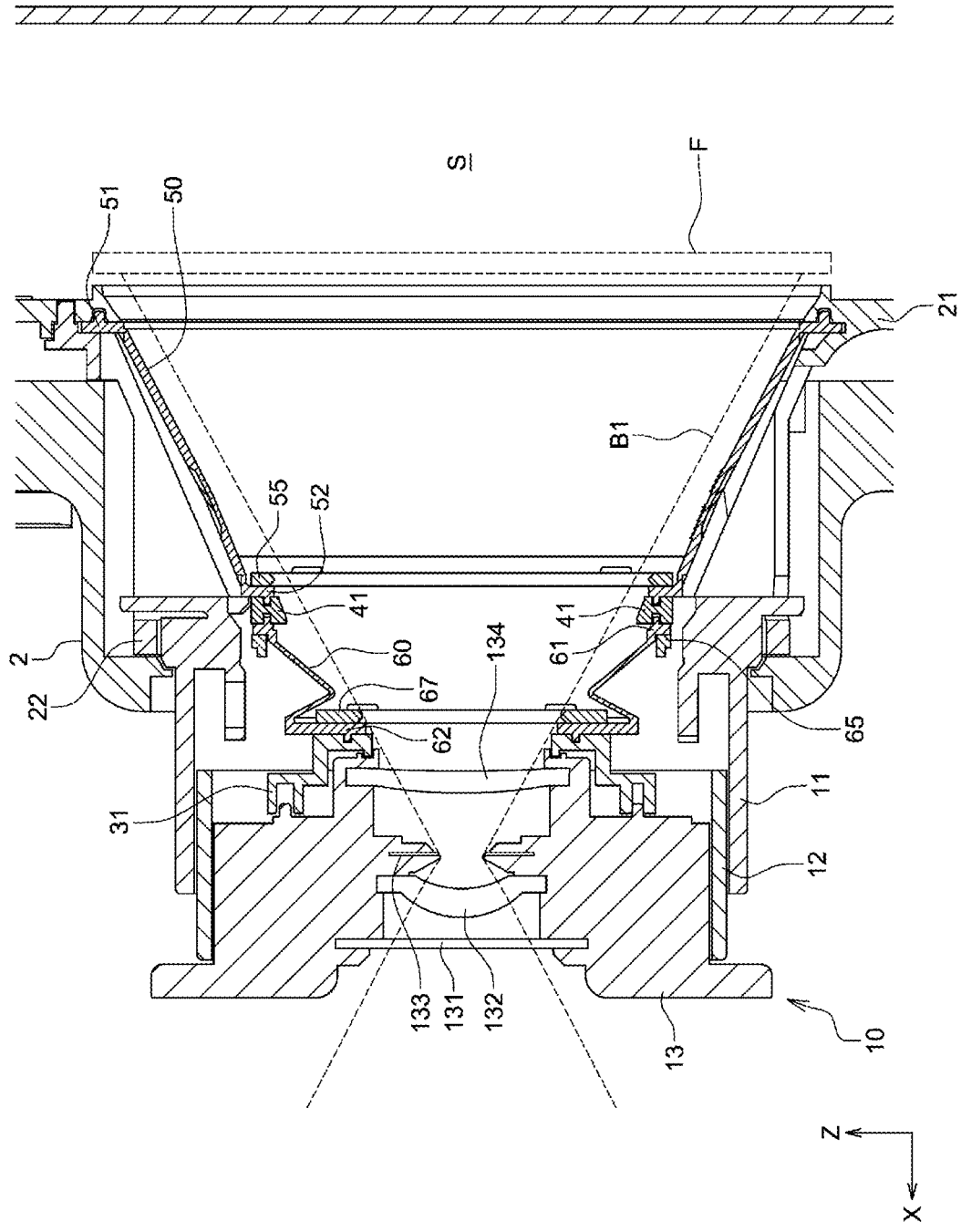
FIG. 9 is a partial longitudinal cross-sectional view of the camera in the first photographing state shown in FIG. 4.

FIG. 9 is a partial longitudinal cross-sectional view of the camera 1 in the first photographing state shown in FIG. 4. As described above, when the user depresses the operation button 8 in the retracted state shown in FIG. 6, the first cylinder 11 in the lens barrel 10 extends in the positive X-direction relative to the barrel 22, and the second cylinder 12 is extended by the moving assembly (not shown) in the positive X-direction relative to the first cylinder 11, causing the camera 1 to be in the first photographing state shown in FIG. 9. In the first photographing state, the third cylinder 13 in the lens barrel 10 is accommodated radially inside the second cylinder 12.

In the first photographing state, the first cylinder 11 in the lens barrel 10 extends in the positive X-direction relative to the barrel 22, and the rear bellows 50 is thus expanded. The rear bellows 50 is outside a light beam B1 projected from the second lens 134 onto the photographic film F and thus avoids being captured in an image projected onto the photographic film F. In the present embodiment, the second cylinder 12 in the lens barrel 10 extends in the positive X-direction relative to the first cylinder 11 in the first photographing state. The front bellows 60 is thus expanded slightly further than in the retracted state shown in FIG. 6. The front bellows 60 is outside the light beam B1 projected from the second lens 134 onto the photographic film F and thus avoids being captured in an image projected onto the photographic film F. In this manner, in the first photographing state, both the rear bellows 50 and the front bellows 60 are outside the light beam B1 projected from the second lens 134 onto the photographic film F and avoid being captured in an image projected onto the photographic film F.

Figure 10:
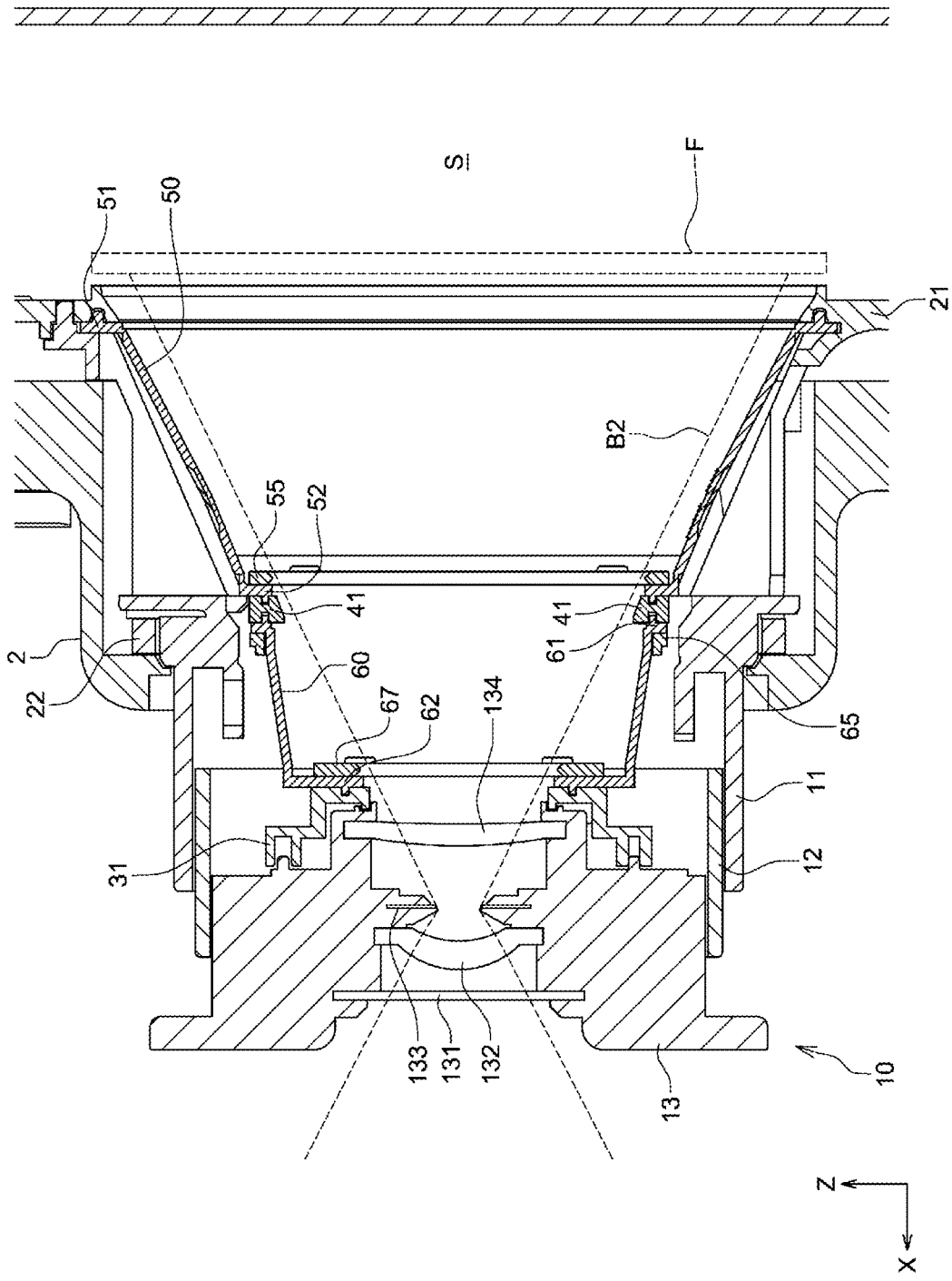
FIG. 10 is a partial longitudinal cross-sectional view of the camera in the second photographing state shown in FIG. 5.

FIG. 10 is a partial longitudinal cross-sectional view of the camera 1 in the second photographing state shown in FIG. 5. When the user manually pulls the third cylinder 13 from the second cylinder 12 in the positive X-direction in the first photographing state shown in FIG. 9, the camera 1 enters the second photographing state shown in FIG. 10. In the second photographing state, the third cylinder 13 in the lens barrel 10 in the first photographing state described above extends in the positive X-direction relative to the second cylinder 12. The front bellows 60 is thus expanded further than in the first photographing state shown in FIG. 9. The front bellows 60 is outside a light beam B2 projected from the second lens 134 onto the photographic film F and thus avoids being captured in an image projected onto the photographic film F. In this manner, in the second photographing state as well, both the rear bellows 50 and the front bellows 60 are outside the light beam B2 projected from the second lens 134 onto the photographic film F and avoid being captured in an image projected onto the photographic film F.

As described above, in the present embodiment, the rear bellows 50 connecting the frame 20 and the first cylinder 11 in the lens barrel 10 and the front bellows 60 connecting the first cylinder 11 and the third cylinder 13 in the lens barrel 10 are included. Thus, both in the first photographing state shown in FIG. 9 and in the second photographing state shown in FIG. 10, the rear bellows 50 and the front bellows 60 are outside the light beams B1 and B2 projected from the second lens 134 onto the photographic film F and avoid being captured in an image projected onto the photographic film F. Thus, when the positions of the lenses 132 and 134 are changed, photographing without vignetting can be performed with the rear bellows 50 and the front bellows 60 preventing entry of light and dust. This allows two different photographing (e.g., normal photographing and macro photographing) operations with the lenses 132 and 134 at different positions.

In the above embodiment, the rear bellows 50 and the front bellows 60 are both connected to the single connecting flange 41 in the rear end of the first cylinder 11 in the lens barrel 10. This structure includes fewer components to reduce cost and also downsizes the camera 1.

Although the rear lens barrel unit includes the first cylinder 11 and the second cylinder 12 in the lens barrel 10 in the above embodiment, the rear lens barrel unit may include a single cylinder or three or more cylinders. In the structure including the rear lens barrel unit that includes the first cylinder 11 and the second cylinder 12 in the lens barrel 10 as in the present embodiment, the second cylinder 12 is accommodated radially inside the first cylinder 11 in the retracted state. The camera 1 can thus be thinner in the optical axis direction. Although the front lens barrel unit includes the third cylinder 13 in the lens barrel 10 in the above embodiment, the front lens barrel unit may include two or more cylinders.

The terms front, frontward, rear, rearward, up, upward, down, downward, and other terms used herein to indicate the positional relationships are used in connection with the illustrated embodiment and are thus changeable depending on the relative positional relationship in the device.

Although the embodiments of the present invention have been described above, the present invention is not limited to the above embodiments and may be modified variously within the scope of its technical idea.

As described above, a camera according to the above aspects of the present invention can perform two different photographing operations with a lens at different positions without vignetting while preventing entry of light and dust. The camera includes a frame including a film compartment to contain a photographic film and a barrel extending from the film compartment in an optical axis direction, and a lens barrel movable in the barrel in the optical axis direction. The lens barrel includes a rear lens barrel unit accommodated radially inside the barrel and movable frontward relative to the barrel, and a front lens barrel unit accommodated radially inside the rear lens barrel unit and movable frontward relative to the rear lens barrel unit. The front lens barrel unit accommodates at least one lens. The camera further includes a rear bellows connecting the frame and the rear lens barrel unit, and a front bellows connecting the rear lens barrel unit and the front lens barrel unit. The lens barrel has a retracted state in which the rear lens barrel unit is accommodated radially inside the barrel, and the front lens barrel unit is accommodated radially inside the rear lens barrel unit, a first photographing state in which the rear lens barrel unit extends frontward relative to the barrel, and the front lens barrel unit is accommodated radially inside the rear lens barrel unit, and a second photographing state in which the rear lens barrel unit extends frontward relative to the barrel, and the front lens barrel unit extends frontward relative to the rear lens barrel unit. In the first photographing state, the rear bellows is expanded and is outside a light beam projected from the at least one lens onto the photographic film, and the front bellows is at least partially contracted and is outside the light beam projected from the at least one lens onto the photographic film. In the retracted state, both the front bellows and the rear bellows may be at least partially contracted.

This structure includes the rear bellows connecting the frame and the rear lens barrel unit and the front bellows connecting the rear lens barrel unit and the front lens barrel unit. Thus, both in the first photographing state and in the second photographing state, the rear bellows and the front bellows are outside the light beams projected from the lens onto the photographic film and avoid being captured in an image projected onto the photographic film. Thus, when the position of the lens is changed, photographing without vignetting can be performed with the rear bellows and the front bellows preventing entry of light and dust. This allows two different photographing (e.g., normal photographing and macro photographing) operations with the lens at different positions without vignetting.

The rear lens barrel unit may include a first cylinder and a second cylinder accommodated radially inside the first cylinder and movable frontward relative to the first cylinder. In this case, the front lens barrel unit may include a third cylinder that is accommodated radially inside the second cylinder in the rear lens barrel unit in the first photographing state and extends frontward relative to the second cylinder in the rear lens barrel unit in the second photographing state. The camera with this structure can be thinner in the optical axis direction in the retracted state.

The rear lens barrel unit may include a first connecting flange to which the rear bellows and the front bellows are connected. This structure in which the rear bellows and the front bellows are connected to the single connecting flange includes fewer components to reduce cost and also downsizes the camera. The front lens barrel unit may include a second connecting flange to which the front bellows is connected.

The camera according to the above aspects of the present invention includes the rear bellows connecting the frame and the rear lens barrel unit and the front bellows connecting the rear lens barrel unit and the front lens barrel unit. Thus, both in the first photographing state and in the second photographing state, the rear bellows and the front bellows are outside the light beams projected from the lens onto the photographic film and avoid being captured in an image projected onto the photographic film. Thus, when the position of the lens is changed, photographing without vignetting can be performed with the rear bellows and the front bellows preventing entry of light and dust. This allows two different photographing (e.g., normal photographing and macro photographing) operations with the lens at different positions without vignetting.

This application claims priority to Japanese Patent Application No. 2019-228954 filed on Dec. 19, 2019, the entire disclosure of which is incorporated herein by reference.

INDUSTRIAL APPLICABILITY

The camera according to one or more embodiments of the present invention is suitably used as a camera that allows a lens barrel to extend with a flexible bellows.

The invention claimed is:
1. A camera, comprising:
   a frame including a film compartment to contain a photographic film and a barrel extending from the film compartment in an optical axis direction;
   a lens barrel movable in the barrel in the optical axis direction, the lens barrel including
      a rear lens barrel unit accommodated radially inside the barrel and movable frontward relative to the barrel, and
      a front lens barrel unit accommodated radially inside the rear lens barrel unit and movable frontward relative to the rear lens barrel unit, the front lens barrel unit accommodating at least one lens;
   a rear bellows connecting the frame and the rear lens barrel unit; and
   a front bellows connecting the rear lens barrel unit and the front lens barrel unit,
   wherein the lens barrel has
      a retracted state in which the rear lens barrel unit is accommodated radially inside the barrel and the front lens barrel unit is accommodated radially inside the rear lens barrel unit,
      a first photographing state in which the rear lens barrel unit extends frontward relative to the barrel and the front lens barrel unit is accommodated radially inside the rear lens barrel unit, and
      a second photographing state in which the rear lens barrel unit extends frontward relative to the barrel and the front lens barrel unit extends frontward relative to the rear lens barrel unit, and in the first photographing state, the rear bellows is expanded and is outside a light beam projected from the at least one lens onto the photographic film, and the front bellows is at least partially contracted and is outside the light beam projected from the at least one lens onto the photographic film.

2. The camera according to claim 1, wherein in the retracted state, each of the front bellows and the rear bellows is at least partially contracted.

3. The camera according to claim 1, wherein the rear lens barrel unit includes
   a first cylinder, and
   a second cylinder accommodated radially inside the first cylinder and movable frontward relative to the first cylinder.

4. The camera according to claim 3, wherein the front lens barrel unit includes a third cylinder accommodated radially inside the second cylinder in the rear lens barrel unit in the first photographing state and extendable frontward relative to the second cylinder in the rear lens barrel unit in the second photographing state.

5. The camera according to claim 1, wherein the rear lens barrel unit includes a first connecting flange to which the rear bellows and the front bellows are connected.

6. The camera according to claim 1, wherein the front lens barrel unit includes a second connecting flange to which the front bellows is connected.

* * * * *